(12) United States Patent
Zhu et al.

(10) Patent No.: US 6,353,612 B1
(45) Date of Patent: *Mar. 5, 2002

(54) PROBING DEVICE

(75) Inventors: Jieming Zhu; Paul Ramsay, both of Fremont; Vince Guan, Placentia; Kha Sin Teow, San Jose, all of CA (US)

(73) Assignee: Brocade Communications Systems, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,445

(22) Filed: Jun. 19, 1998

(51) Int. Cl.[7] .......................... H04L 12/50; H04L 12/42
(52) U.S. Cl. ........................................ 370/360; 370/449
(58) Field of Search ................................. 370/360, 363, 370/364, 466, 463, 449, 451, 452, 252–254; 359/117, 120, 119, 121; 705/44; 709/226; 713/161, 168, 170

(56) References Cited

U.S. PATENT DOCUMENTS

| | | | | |
|---|---|---|---|---|
| 5,519,695 A | * | 5/1996 | Purohit | 370/360 |
| 5,598,541 A | * | 1/1997 | Malladi | 709/200 |
| 5,619,497 A | | 4/1997 | Gallagher et al. | 370/394 |
| 5,638,518 A | | 6/1997 | Malladi | 395/200.21 |
| 5,734,642 A | * | 3/1998 | Vaishnavi | 370/499 |
| 5,768,530 A | | 6/1998 | Sandorfi | 395/200.63 |
| 5,781,801 A | * | 7/1998 | Flanagan | 370/360 |
| 5,809,428 A | | 9/1998 | Garahi et al. | 455/517 |
| 5,835,496 A | | 11/1998 | Yeung et al. | 370/514 |
| 6,119,121 A | * | 11/1998 | Zhu | 707/101 |
| 5,954,796 A | * | 2/1999 | McCarty | 709/222 |
| 5,829,973 A | | 4/1999 | Martinez et al. | 395/835 |
| 5,894,481 A | | 4/1999 | Book | 370/412 |
| 5,956,723 A | | 9/1999 | Zhu | 707/100 |
| 5,978,863 A | | 11/1999 | Gates et al. | 710/18 |
| 6,005,849 A | | 12/1999 | Roach et al. | 370/276 |
| 6,006,283 A | | 12/1999 | Hsieh et al. | 710/9 |
| 6,011,799 A | * | 1/2000 | Kerstein | 370/449 |
| 6,118,776 A | * | 9/2000 | Berman | 370/425 |

FOREIGN PATENT DOCUMENTS

| | | | |
|---|---|---|---|
| EP | 0 649 098 A2 | 9/1994 | G06F/15/16 |
| EP | 0 841 781 A2 | 5/1998 | H04L/12/44 |
| WO | WO 98/36537 | 8/1998 | H04L/12/44 |

OTHER PUBLICATIONS

Web Page for Technical Committee T11/T11 Home Page; http://www.t11.org/top.html; 1 pg.
IP Over Fibre Channel (ipfc); file:///Untitled; 2 pgs.
FCIA; Welcome to the single source for Fibre Channel information . . . ; 1pg.
Main Index; Fibre Channel; 1pg.
Fibre Channel Fabrics: Introduction; Devices; Ancor; Arcxel Technologies; Brocade; IBM; McData; 2pgs.
Fibre Channel Physical and Signaling Interface (FC–PH), Rev. 4.3, working draft proposed American National Standard for Information Systems, Jun. 1, 1994; 479 pgs.
Fibre Channel Generic Services—2 (FC–GS–2), Rev. 5.3, NCITS working draft proposed American National Standard for Information Technology, Nov. 25, 1998; 106 pgs.
Information technology—SCSI Primary Commands—2 (SPC–2), Working Draft T10 Project 1236–D, Rev. 4, Jul. 21, 1998; 195 pgs.

* cited by examiner

*Primary Examiner*—Wellington Chin
*Assistant Examiner*—Steven Nguyen
(74) *Attorney, Agent, or Firm*—Wong, Cabello, Lutsch, Rutherford & Brucculeri, P.C.

(57) ABSTRACT

A probing device for resolving the limitations of fabric registration by providing a fabric with a system and method for concurrently probing multiple end-devices, which would otherwise be unusable to register with the fabric, to registration information. In addition, by relying upon the probing device, a fabric can avoid requiring any end-devices from having to initiate registration with the fabric.

20 Claims, 7 Drawing Sheets

PROBING DEVICE

BACKGROUND OF THE INVENTION

1. Field of the Invention

This invention generally relates to network switching devices and more particularly to Fibre Channel switching devices.

2. Description of the Related Art

With client/server applications demanding high bandwidth and low latency input/output (I/O) characteristics for high speed data transmissions, conventional network and channel technologies are confronted with serious limitations. Conventional network technology (e.g., Ethernet- or Token Ring-based systems) provides shared bandwidth access for multiple clients and the ability to handle unpredictable small-packet bursty traffic, but lacks the ability to meet the growing bandwidth requirements of many client/server applications. Conventional channel technology (e.g., telephony) provides high speed data and low latency transfer characteristics, but lacks the ability to provide connectivity among multiple clients with small-packet bursty traffic.

Fibre Channel, an American National Standards Institute (ANSI) standard for high speed fiber optic communication interfaces, offers the joint advantages of both the conventional network and channel technology to a variety of Fibre Channel compliant hardware systems such as personal computers, workstations, mainframes, storage devices and servers. With regard to client/server applications, the use of such Fibre Channel-based systems is proliferating into mass storage, medical and scientific imaging, multimedia communication, transactional processing, distributed computing and distributed database processing applications.

For a source Fibre Channel compliant end-device (Nx__Port), which is attached to a Fibre Channel fabric, to communicate with other Nx-Ports, which are attached to the fabric, the source Nx__Port must log into the fabric as well as register and query the fabric's Simple Name Server (SNS) for Fibre Channel attributes of other registered Nx__Ports. With regard to logging into the fabric, the source Nx__Port must support the Fabric LOGIN (FLOGI) service. To communicate with the other Nx__Ports, the source Nx__Port must support the destination Port LOGIN (PLOGI) service as well as be able to register and query with the SNS for Fibre Channel parameters.

In conventional systems, the source Nx-Port initiates FLOGI to allow the source Nx__Port to obtain service parameters relating to the fabric. If the source Nx__Port completes FLOGI, the source Nx__Port then registers its Fibre Channel attributes with the SNS, thereby enabling the source Nx__Port to query the SNS for the Fibre Channel attributes of other Nx__Ports. If the source Nx__Port successfully performs FLOGI as well as registers with the SNS, the source Nx__port will be able to initiate PLOGI to communicate with any other registered Nx__Port.

Such robust login and registration functionality, however, does not always exist in Nx__Ports. For example, in some instances, even if the Nx__Port is a public device (e.g., capable of FLOGI), the Nx__Port may not be designed to initiate such operations as SNS query and registration, thereby precluding the source Nx__Port from possessing the capability for communicating with other Nx__Ports. Without SNS registration, other Nx__Ports will not be informed of the existence of the source Nx__Port and will not be able to successfully perform PLOGI with that source Nx__Port. In yet another instance with regard to the arbitrated loop topology, not every NL__Port is a public port, thereby resulting in private NL__Ports unable to perform FLOGI with the fabric or PLOGI with other Nx__Ports. The conventional solution to each of these limitations is for the Fibre Channel fabric system not to support these Nx__Ports.

What is needed is a system and method that concurrently registers multiple end-devices, such as source Nx__Ports, with the fabric without requiring the source end-device to possess the requisite functionality for initiating the login and registration with the fabric.

SUMMARY OF INVENTION

In accordance with the system and method of the present invention, the limitations of fabric registration by end-devices are resolved by enabling a fabric to concurrently probe multiple end-devices to obtain registration information from the end-devices. By allowing the fabric to directly obtain such registration information, end-devices, which would otherwise be unable to register with the fabric, can now be registered. In addition, by relying upon such a probing system and method, a fabric also can avoid requiring any end-devices from having to initiate login with the fabric.

In accordance with the principles encompassed within the present invention, the system includes a switch port manager module, a probe module and a registration server. The switch port manager module detects the active switch ports coupled to the fabric and initiates the probing of a plurality of end-devices coupled to at least one of these active switch ports. The probe module then responds by allocating probe resources for probing each of the plurality of end-devices coupled to each active switch port. Once the probing resources are allocated, the probe module logs into each end-device and probes each end-device for registration information, such as service parameters and a symbolic name. The switch port manager module then triggers the registration server to register this registration information with the fabric for later retrieval by other registered end-devices.

DETAILED DESCRIPTION

A preferred embodiment of the present invention is now described with reference to figures where like reference numbers indicate identical or functionally similar elements and the left most digit of each reference number corresponds to the figure in which the reference number is first used.

The present invention resolves the limitations of login and registration with the fabric by providing the fabric with the functionality to initiate the probing and the recording of service parameters and the symbolic name of end-devices. The following discussion specifically will focus upon Fibre Channel, but one skilled in the art will recognize that the present invention may be applied to any channel or network technology, which utilizes a fabric.

Figure 1:
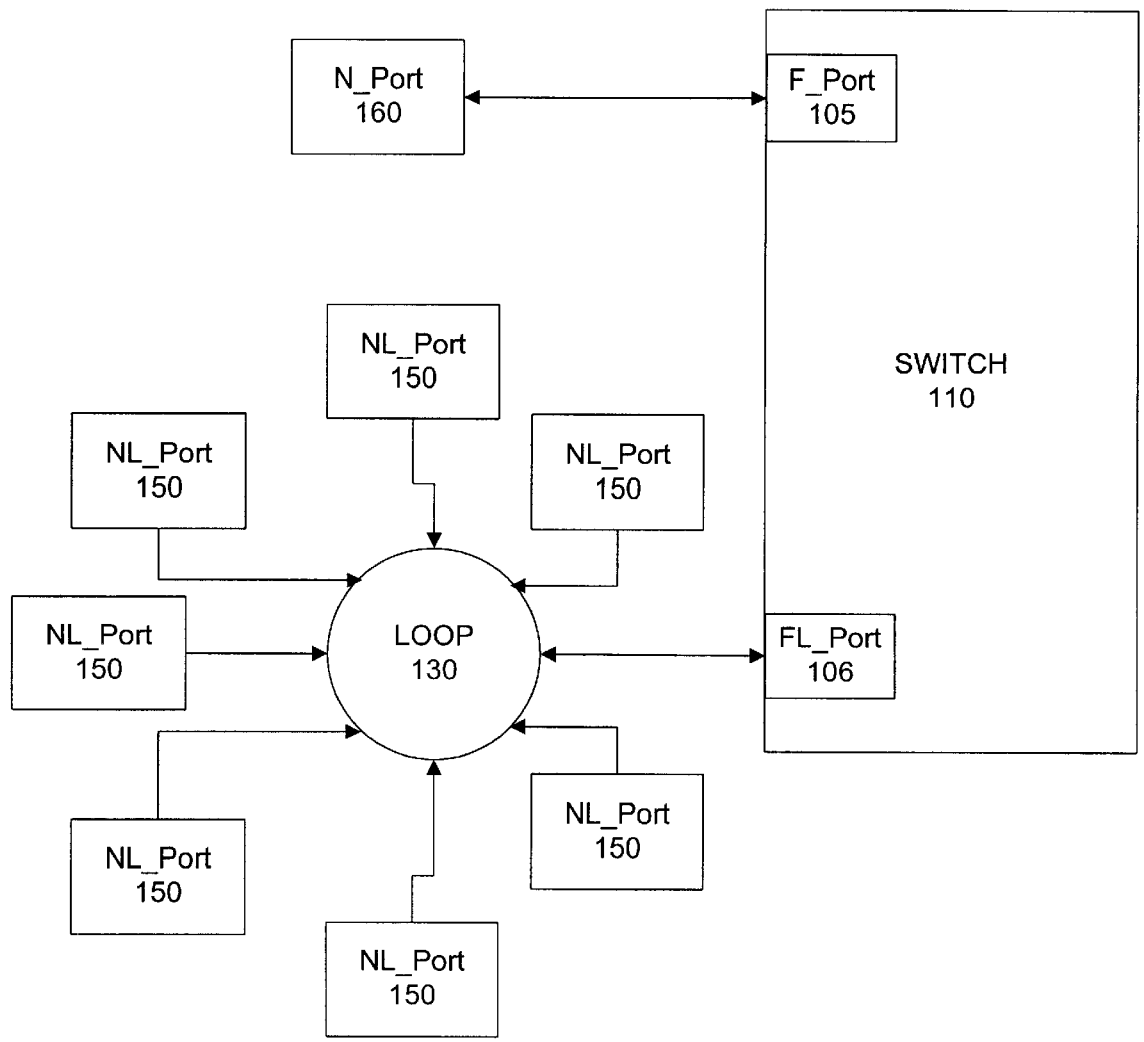
FIG. 1 is a block diagram of an overview of a preferred embodiment of the present invention.

FIG. 1 is an overview of a preferred embodiment of a Fibre Channel system 100. As defined in the ANSI Fibre Channel Physical (FC-PH) standard, revision 4.3 (ANSI X3.230:1994), which is incorporated by reference in its entirety herein, Fibre Channel establishes a logical point-to-point serial data connection between a source node and a destination node. By allowing data to be moved from one node to another without regard to data format or meaning, Fibre Channel promotes the efficient transferring of data without requiring the use of various network protocols. To further maintain high data transfer rates, each node utilizes a send buffer to transmit the data to another node and a receive buffer to receive data from another node.

To establish a logical serial channel between nodes, Fibre Channel utilizes either a point to point topology or a loop topology. As discussed in the FC-PH standard, the point to point topology directly connects two Fibre Channel nodes. As discussed in the Fibre Channel Arbitrated Loop (FC-AL) standard (ANSI X3.272:1996) and the Fibre Channel Fabric Loop Attachment (FC-FLA) standard (ANSI Project 1235-DT), which are both incorporated by reference in their entirety herein, the loop topology utilizes an arbitrated loop with ring connections for providing multiple nodes with the ability to arbitrate access to a shared bandwidth. To provide a bi-directional connection from one node to another, a Fibre Channel switch fabric, which is defined in the Fibre Channel Fabric Generic Requirements (FC-FG) (ANSI X3.289:1996) in conjunction with the draft (revision 3.30) of the Fibre Channel Switch Fabric and Switch Control Requirements (FC-SW) (ANSI Project 959-D) and both are incorporated by reference in their entirety herein, can be integrated into either one of the before-mentioned topologies.

The Fibre Channel system 100 includes a switch 110, a point to point end-device (N_Port) 160, an arbitrated loop 130 and a plurality of arbitrated loop end-devices (NL_Ports) 150. The arbitrated loop 130 provides the plurality of NL_Ports 150 with the ability to arbitrate access to a shared bandwidth. The switch 110, which maintains a Fibre Channel fabric (not shown), includes a point-to-point connection (F_Port) 105 and an arbitrated loop connection (FL_Port) 106. The F_Port 105 connects the fabric to the N_Port 160. The FL_Port connects the fabric to multiple NL_Ports, which are coupled to the arbitrated loop 130. The N_Port and NL_Port jointly can be referenced as Nx_Ports. The F_Port and the FL_Port jointly can be referenced as Fx_Ports. From the perspective of the N_Port and the NL_Port, however, the F_Port and the FL_Port also can be considered Nx_Ports. To avoid confusion, however, through the remaining discussion, a reference to an Nx_Port only will be a reference to N_Ports and NL_Ports.

Figure 2:
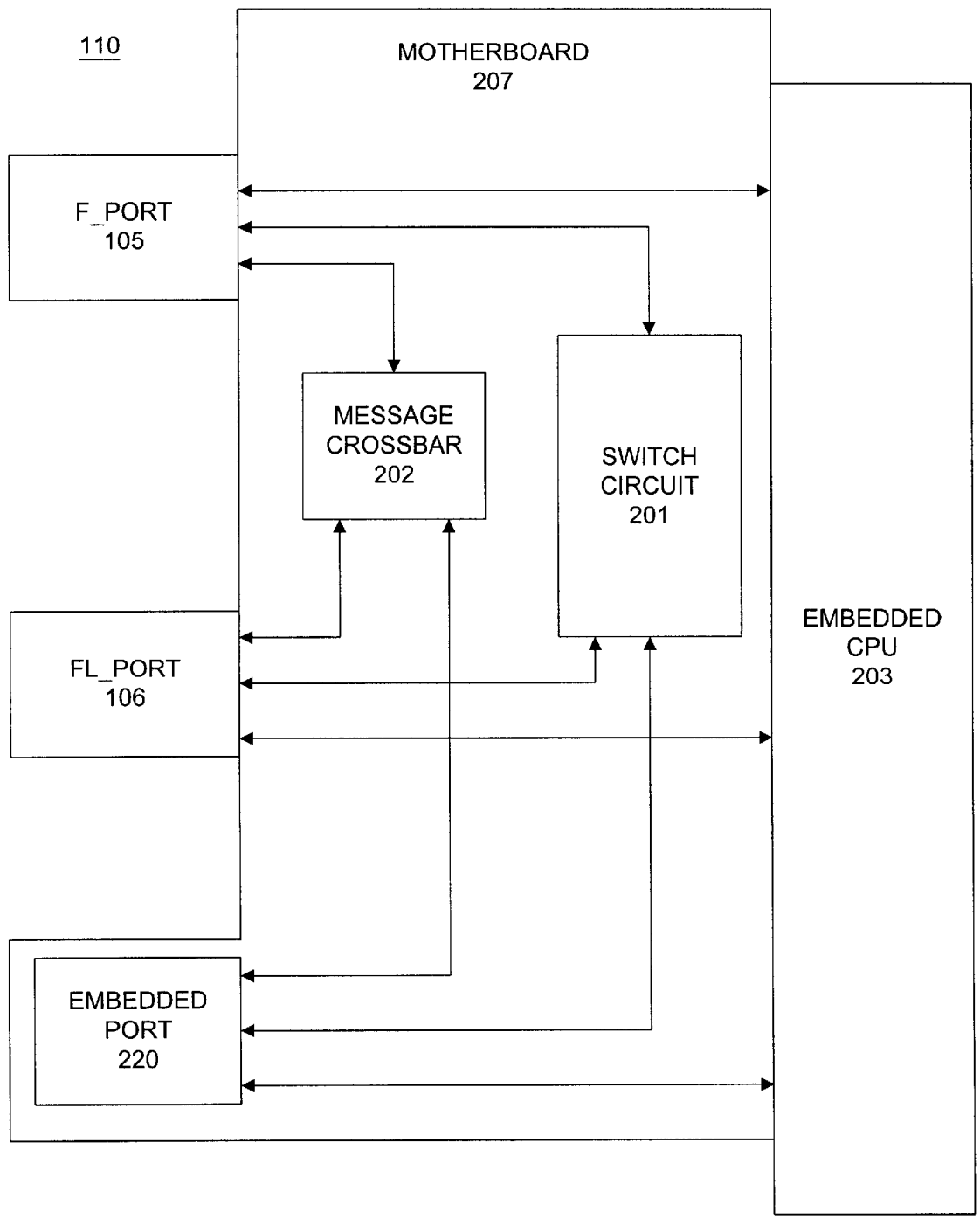
FIG. 2 is a detailed block diagram of the switch of FIG. 1.

FIG. 2 is a more detailed block diagram of the Fibre Channel switch 110. The switch 110 provides connectivity for up to 16 Fibre Channel compliant Fx_Ports (either F_Ports or FL_Ports). With certain Fx_Ports (e.g., FL_Ports) supporting up to 126 Nx_Ports (e.g., NL_Ports), each switch 110 has a potential capacity of supporting up to 2,016 NL_Ports. In addition, the switch 110 is scaleable to allow multiple switches 110 (e.g., up to 5 switches) to be interconnected in order to enlarge the size of the Fibre Channel fabric and the number of Nx_Ports that are supported. For example with five switches 110 interconnected, the Fibre Channel fabric of a preferred embodiment has the capacity of supporting up to 9,072 NL_Ports.

The switch 110 includes a mother board 207, an F_Port 105, an FL_Port 106 and an embedded central processing unit (CPU) 203. The F_Port 105, which is a daughter board that plugs into the mother board 207, is an interface between the motherboard 207, which maintains the fabric, and an N_Port 160. A detailed description of the F_Port 105 as it relates to a G-Port (a general port, which supports both F_Port and E-Port functionality) is discussed in U.S. patent application Ser. No. 08/823,025, "Fibre Channel Switching System And Method" by David C. Banks, Steven L. Farnsworth, Bent Stoevhase, and Paul Ramsay, which was filed on Mar. 21, 1997 and whose subject matter is incorporated in its entirety herein by reference. The FL_Port 105, which is an F_Port with arbitrated loop capabilities, also is a daughter board that plugs into the mother board 207. The FL_Port 105 interfaces between the NL_Port devices (e.g., up to 126 NL_Ports), which are either public or private devices, and the mother board 207 of the Fibre Channel switch 110. A more detailed description of the FL_Port is discussed in the before mentioned Fibre Channel Arbitrated Loop (FC-AL) (ANSI X3.272:1996) and Fibre Channel Fabric Loop Attachment (FC-FLA) (ANSI Project 1235-DT) standards. The embedded CPU 203, like the FL_Port 106 and the F_Port 105, is a daughter board, which plugs into the mother board 207. One skilled in the art will realize that FIG. 2 only illustrates an exemplary embodiment of the present invention. Alternative embodiments can integrate together any combination of the before-mentioned components (e.g., the combining of the F_Port and the FL_Port into one mother board, daughter board or into one or more integrated circuits).

The mother board 207 includes a message crossbar 202, a switch circuit 201 and an embedded port 220. The embedded port 220 is a logical N_Port, which is operated by firmware, which is stored and executed within the embedded CPU 203. The embedded CPU 103 is responsible for initialization, configuration and management of the switch 110 and provides the switch with a variety of enhanced functionality such as support for operating a simple name server (SNS) module, a switch port manager module and a probe module. The SNS module is discussed in greater detail in Fibre Channel $2^{nd}$ Generation Generic Services (FC-GS-2), revision 4.00 (Project 1134-D), which is incorporated by reference in its entirety herein. Rather than requiring the Nx_Ports to initiate the registration of Fibre Channel—Level 4 (FC-4) type and symbolic name information with the SNS module, the embedded port 220 of a preferred embodiment of the present invention relies upon itself to initiate login operations, such as PLOGI and process login (PRLI), to obtain this necessary registration information for the SNS module.

Once the embedded port 220 establishes the operating environment with the Nx_Ports, the switch circuit 201, which includes a central memory (not shown) and data path control circuits (not shown), facilitates the transfer of information from one source Nx_Port (via a source Fx_Port) to a destination Nx_Port (via a destination Fx_Port). The central memory is a set of buffers, which are assigned to each source Fx_Port, which is coupled to at least one Nx_Port. As a source Fx_Port receives and validates a frame from the source Nx_Port, the source Fx_Port stores the frame in one of the corresponding buffers and forwards a routing request with a buffer pointer through the message crossbar 202 to the destination Fx_Port, which is coupled to the destination Nx_Port.

When the destination Fx_Port is ready to receive the frame, the destination Fx_Port reads the frame contents from the appropriate designated buffer in central memory and forwards the frame to its transmit interface. When the destination Fx_Port has completed retrieving an entry for a frame from its internal transmit queue in preparation for frame transmission to the attached destination Nx_Port, the destination Fx_Port sends a "transmission complete" (Finish) message to the source Fx_Port, thereby allowing the source Fx_Port to reuse the buffer in central memory for subsequent received frames.

Figure 3:
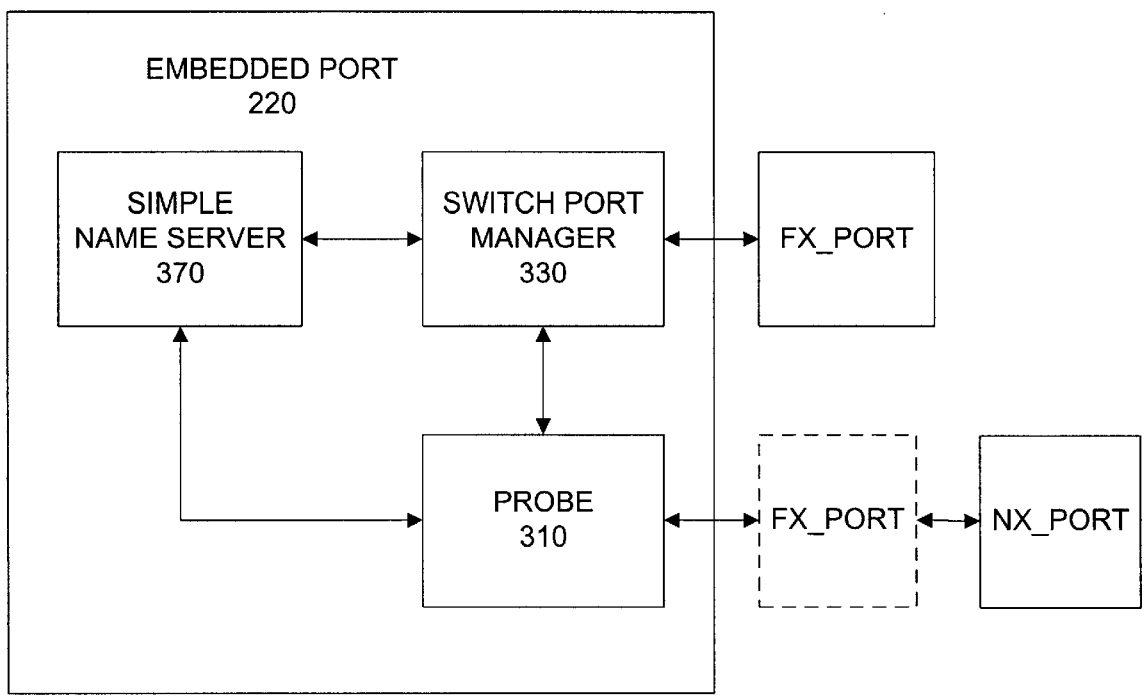
FIG. 3 is a detailed block diagram of the embedded port of FIG. 1.

FIG. 3 illustrates a detailed functional block diagram of the embedded port 220, which includes a simple name server (SNS) module 370, a switch port manager module 330, and a probe module 310. The firmware, which is utilized to generate such functionality in the embedded port 220, is stored and executed in the embedded CPU 203 and its associated memory (not shown). The embedded CPU 203 also includes a plurality of probe buffers, which enable the embedded CPU 203 to concurrently probe multiple Nx_Ports.

In order for a source Nx_Port to communicate with destination Nx_Ports as well as with the fabric, the source Nx_Port first exchanges service parameters with the fabric through the Fx_Port by relying upon a fabric login (FLOGI) link service sequence exchange. The purposes of FLOGI are to determine the presence or absence of the fabric, to establish the specific set of operating characteristics with the fabric (e.g., what type of support the Nx_Port requests), to optionally assign or confirm the port identifier of the source Nx_Port and the fabric and to initialize the buffer-to-buffer credit.

The probe module 310, which is coupled to the SNS module 370 and the switch port manager module 330 and accesses the Nx_Ports through the Fx_Ports, enables the embedded port 220 to initiate the probing of the Nx_Ports and the registration of service parameter information, such as symbolic name (e.g., vendor and version information) and FC-4 type information (e.g., SCSI Fibre Channel Protocol (FCP) compliance), with the SNS module 370. FCP, which is defined in the ANSI draft of Fibre Channel Protocol for SCSI, revision 012 (X3.269-199X), is a variation of the Small Computer System Interface (SCSI) command set, which is in accordance with the SCSI architecture model (X3.270-199X), both of which are incorporated by reference in its entirety herein. In particular, FCP is a mapping device and task protocol, which is used to implement a standard frame format (Fibre Channel FC-PH Exchanges) and a standard hierarchy of transmission units for transmitting information units (IU) to carry SCSI information. For example, FCP maps the input/output (I/O) operation into an exchange and the request and response primitives of an I/O Operation into the IUs.

By enabling the embedded port 220 to probe the Nx_Ports, the probe module 310 ensures that Nx_Ports, which are unable to perform FLOGI, PLOGI or PRLI, still can interoperate with the switch 110. In addition, by having the embedded port 220, rather than the Nx_Port initiate the registration of the service parameters, the switch 110 also can circumvent the need for the Nx_Ports to perform a fabric login (FLOGI), which in a conventional Fibre Channel system is necessary prior to initiating PLOGI and PRLI. The underlying procedure of the probe module 310 further will be discussed with regard to FIG. 4.

The switch port manager module 330, which is coupled to the probe module 310, the SNS module 370 and the Fx_Port, serves as the central controller of the embedded port 220 with regard to the probing and registering of the Nx_Ports. In particular, the switch port manager module 330 controls the initiation of the probing of the Nx_Ports by the probe module 310 and after the probing is completed, the registration of the Nx_Port by the SNS module 370. Once the SNS module 370 stores the registration information, any Nx_Port, which is registered with the SNS module 370, can obtain the registration information of any other registered Nx_Port.

Figure 4:
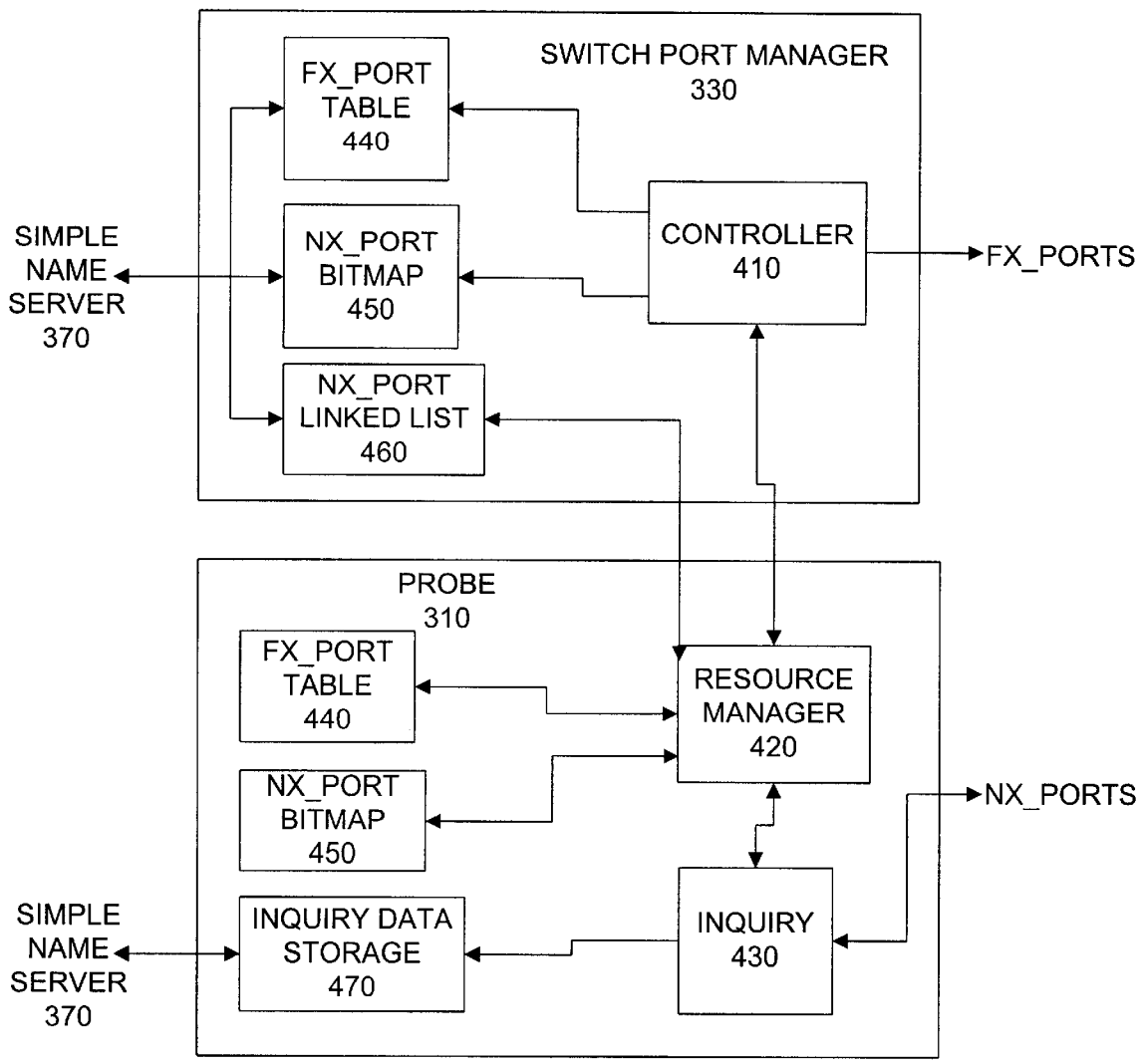
FIG. 4 is a detailed block diagram of the functional sub-components of the switch port manager module and the probe module of FIG. 3.
Figure 5:
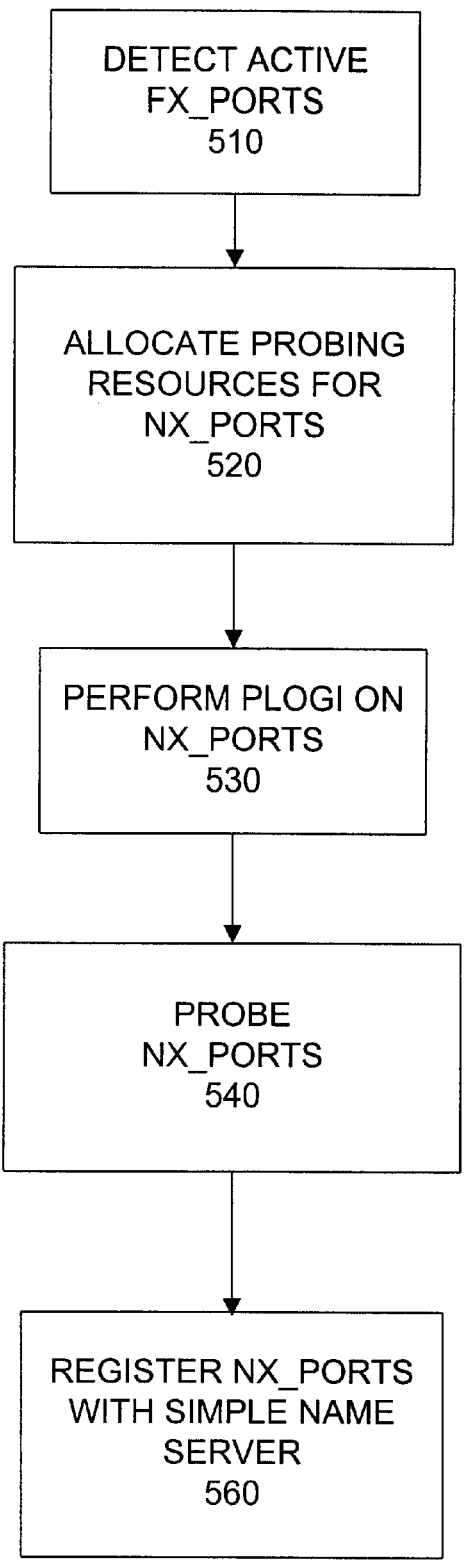
FIG. 5 is an overview flow diagram of the probing and registration of Nx__Ports of FIG. 4.

FIG. 4 in conjunction with FIG. 5 illustrates a detailed block diagram of the switch port manager module 330 and the probe module 310. The switch port manager module 330 includes a controller module 410, an Fx_Port table 440 and for each Fx_Port, an Nx_Port bitmap 450 and an Nx_Port linked list 460. The probe module 310 includes a resource manager module 420, an inquiry module 430, an inquiry data storage module 470, the Fx_Port table 440 and for each active Fx_Port, the Nx_Port bitmap 450. To avoid unneeded complexity, however, only one Nx_Port bitmap 450 and Nx_Port linked list 460 is illustrated in FIG. 4.

The controller module 410, which is coupled to the resource manager module 420, initiates the probing of the Nx_Ports by detecting 510 each connection of an active Fx_Port to the switch 110 and by recording the existence of each Fx_Port in the Fx_Port table 440. The controller module 410 then transfers the current data in the Fx_Port table 440 to the probe module 310 and triggers the initiation of the probing of the Nx_Ports, which are attached to each active Fx_Port represented within the Fx_Port table 440.

When the resource manager module 420 of the probe module 310 is activated by the controller module 410, the resource manager module 420 utilizes the information contained within the Fx_Port table 440 to allocate 520 the limited probing resources (buffers) (not shown), which are within the embedded CPU 203, to Nx_Ports. This allocation of probing resources is necessary because the number of probing buffers, which are available to the probe module 310, is considerably less than the theoretical maximum number of Nx_Ports. For example, in a preferred embodiment where up to 126 Nx_Ports (e.g., NL_Ports) are supported for every Fx_Port (e.g., FL_Port) and as many as 16 FL_Ports can be attached to each of potentially 5 interconnected switches 110, the theoretical maximum number of NL_Ports, which concurrently may require probing buffers is 2,016.

To rectify this probing resource limitation, the resource manager module 420 responds to the controller module 410 by generating an Nx_Port bitmap 450 for each active Fx_Port, which represents up to 126 Nx_Ports (e.g., NL_Ports). For simplicity, however, only one of the plurality of Nx_Port bitmaps 450 is illustrated in FIG. 4. To ensure that these limited numbers of probing buffers are allocated in a systematic manner for concurrent probing of multiple Nx_Ports of active Fx_Ports, the resource manager module 420 associates an exchange resource called a probe information unit (OU) with each buffer and allocates a predefined number of IUs to Nx_Ports on each active Fx_Port. Unlike conventional IUs, the probe IUs in a preferred embodiment of the present invention are sequence level encapsulators, which store additional information such as PLOGI payload and frame header information.

To manage the allocation of these probe IUs to Nx_Ports, the resource manager module 420 alters the Nx_Port bitmap 450 for each of the active Fx_Ports to reflect the Nx_Ports, to which the probe IUs have been allocated. The resource manager module 420 stores an identifier within the Nx_Port bitmap 450 of the probe module 310 next to each of these Nx_Ports to notate which Nx_Ports currently are allocated probe IUs.

The resource manager module 420 also utilizes the identifier to manage possible timeouts of probe IUs associated with specific Nx_Ports. For example, if a probe IU fails to generate a successful probing of an Nx_Port within a predefined amount of time, the resource manager module 420 terminates the probing of that Nx_Port and notates the Nx_Port as not having FC-4 services available or failing to be attached to the active Fx_Port. The resource manager module 420 then allocates the probe IU to the next available Nx_Port within the Nx_Port bitmap 450, which requires a probe IU. Until the switch port manager module 330 triggers the resources manager module 420 to probe the new on-line Nx_Ports attached to a specific active Fx_Port, the inquiry module 430 does not attempt to again probe the Nx_Ports, which were marked as inaccessible. These attempts to allocate probe IUs to each Nx_Port that can be attached to the active Fx_Port ensures that the Nx_Ports do not have to initiate any type of procedure in order for the probe module 310 to identify that an Nx_Port is attached to the active Fx_Port.

Figure 6:
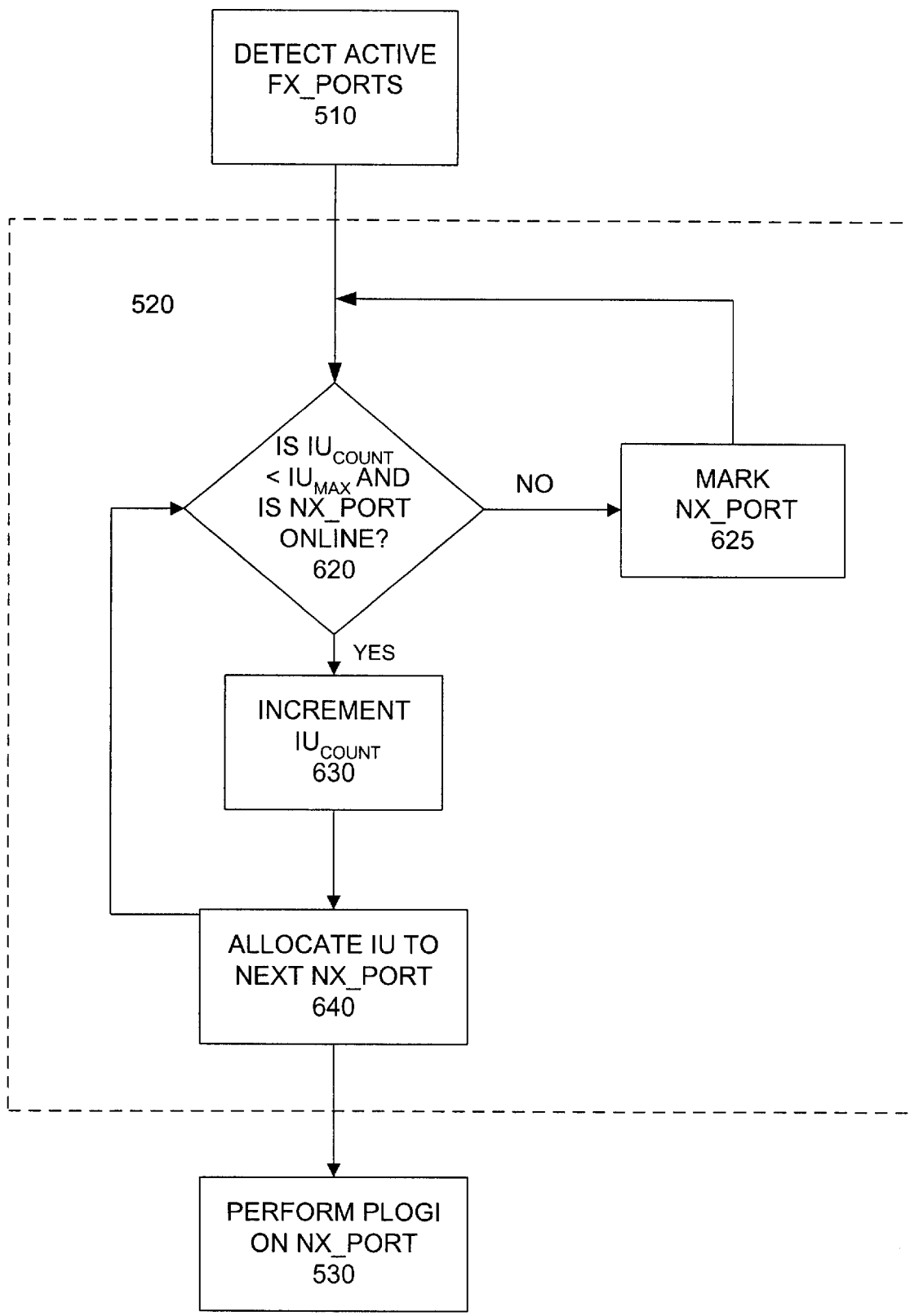
FIG. 6 is a detailed flow diagram of the allocation of probing resources of FIG. 4.
Figure 7:
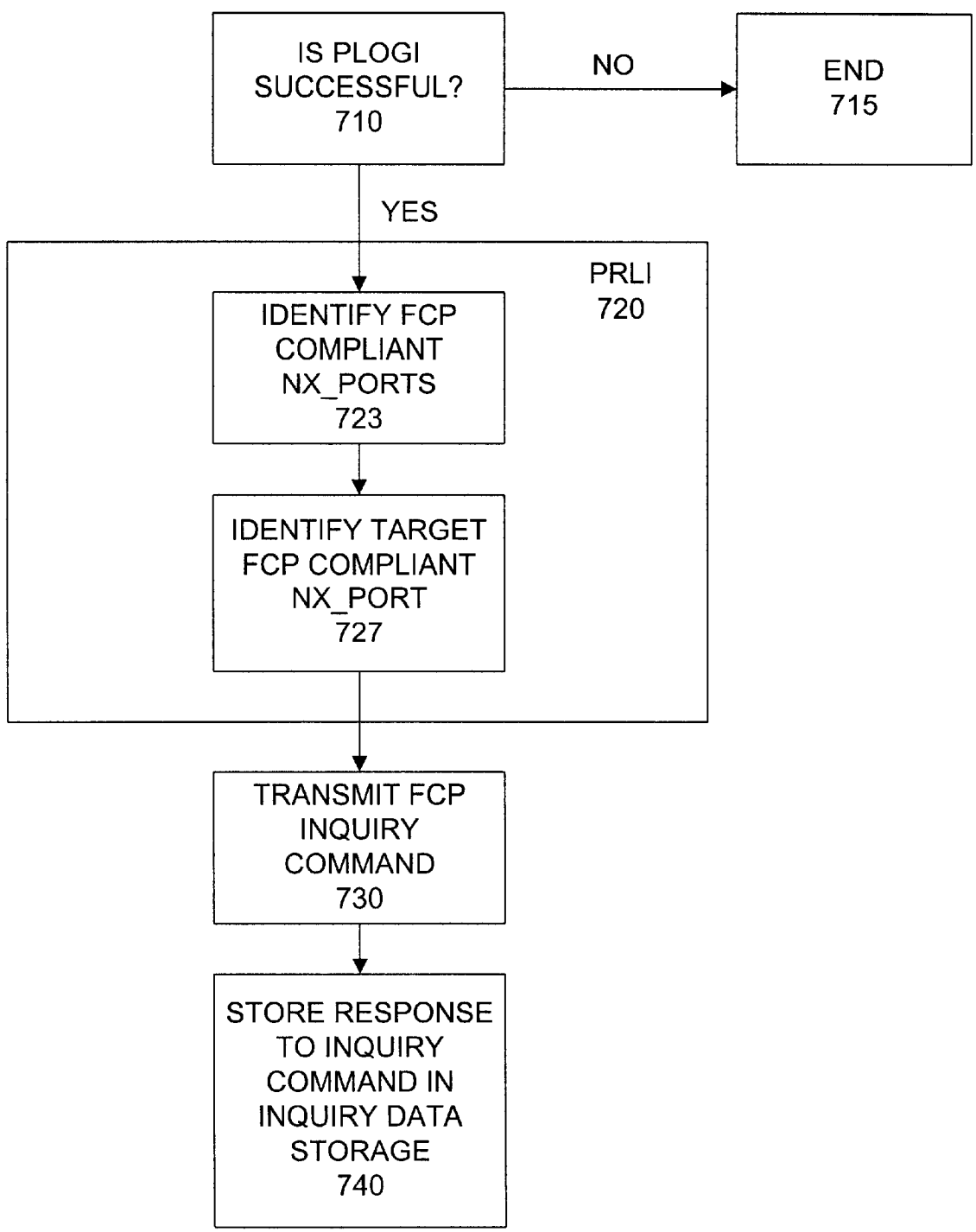
FIG. 7 is a detailed flow diagram of the probing of the Nx__Port s of FIG. 4.

To further understand the underlying process of allocation of probe IUs, FIG. 6 illustrates a flow chart of the method by which the resource manager module 420 utilizes the Nx_Port bitmap 450 to allocate probing resources to multiple Nx_Ports. The resource manager module 420 begins the allocation of probe IUs by comparing 620 the current value ($IU_{count}$), of an IU allocation counter with the maximum number of IUs ($IU_{maximum}$), which are available to the probe module 310 for that specific active Fx_Port. If the $IU_{count}$, is less than the $IU_{maximum}$ limit, then the resource manager module 420 increments 630 the $IU_{count}$, by 1 and allocates 640 the available IU to the next Nx_Port in the Nx_Port bitmap 450 for that specific active Fx_Port. If the $IU_{count}$ is equal to $IU_{minimum}$, then the Nx_Port, which was next to receive a probe IU, is marked 625 in the Nx_Port bitmap 450 as requiring the next free probe IU.

Once a probe IU is allocated to an Nx_Port, PLOGI is initiated 530 by the inquiry module 430 of the embedded port 220. The purpose of initiating PLOGI from the inquiry module 430 of the embedded port 220, rather than from the Nx_Port attached to the active Fx_Port, is to enable the embedded port 220 to transmit and receive fabric service parameters to and from the Nx_Port without requiring the Nx_Port to initiate either a FLOGI or PLOGI interchange sequence.

In a conventional system, an Nx_Port would have to initiate a FLOGI interchange sequence with the switch 110 in order to transfer similar information to the switch 110. However, if the Nx_Port did not support the initiation of a FLOGI sequence, the Nx_Port would be inoperable in the conventional system. In a preferred embodiment of the present invention, since PLOGI is required for any Fibre Channel compatible port, by initiating PLOGI from the inquiry module 430 of the embedded port 220, these very same unsupportable Nx_Ports now are supportable without requiring any modification to the Nx_Ports.

The payload of the PLOGI sequence contains information regarding the embedded port 220. In particular, service parameters within the payload represent numerical parameters, which manage the fabric, including the version of FC-PH that the switch 110 can support. The Port Name within the payload identifies the numerical representation of the embedded port 220 for identification purposes. The Fabric_Name within the payload identifies the numerical representation of the fabric for identification purposes. The Nx_Port Class of Service parameters within the payload are numerical values, which are divided into various categories, such as class 1, class 2 or class 3. The Vendor Version Level within the payload specifies the numerical SC-PH version levels for the embedded port 220, which deviate in a vendor-specific manner from the FC-PH version levels specified in the service parameters.

Upon a destination Nx_Port, which corresponds to a numerical address (D_ID), receiving the PLOGI request from the embedded port 220, which corresponds to a numerical address (S_ID), the destination Nx_Port allocates individual port resources to process the PLOGI request. These allocated resources are used to establish a link (open exchange) between the inquiry module 430 of the embedded port 220 and the destination Nx_Port. The destination Nx_Port then transmits a reply sequence based upon the received PLOGI sequence. The reply sequence is an Accept (ACC) link service sequence within the exchange identified by the original source identifier (S_ID), which corresponds to the embedded port 220, and the destination identifier (D_ID), which corresponds to the responding destination Nx_Port.

The payload of the ACC sequence contains similar information as discussed with regard to the PLOGI sequence. Upon receipt of this ACC sequence by the inquiry module 430, the switch port manager module 330 stores the login service parameters of this destination Nx_Port in the Nx_Port linked list 460, which is located within the switch port manager module 330. In a preferred embodiment, the Nx_Port linked list 460 is a dynamic table, which stores the login service parameters, which includes the port identifier, the port world wide name, the node world wide name, the class of service.

Once PLOGI successfully is completed, further communication between the destination Nx_Port and the embedded port 220 of the switch 110 may be initiated or accepted without requiring any further registration by the Nx_Port. Since PLOGI provides an Nx_Port with embedded port 220 service parameters, which are analogous to the fabric service parameters, and the embedded port 220 with service parameters of the Nx_Port, all necessary FLOGI related service parameters are obtained without requiring the Nx_Port to initiate either FLOGI or PLOGI. Since all FLOGI related information was obtained by the embedded port 220 by utilizing PLOGI in a preferred embodiment, the initiation of FLOGI is unnecessary and repetitive. One skilled in the art will recognize that even though the discussion of the before-mentioned method and system refers to a Fibre Channel system, similar fabric-based login service embodiments can be implemented for logging end-devices into a fabric of an alternative network or channel system.

When PLOGI has been deemed successful 710 between the embedded port 220 and the Nx_Port, the embedded port 220 initiates the probing 540 of the Nx_Port for FC-4 type information including whether the Nx_Port is SCSI Fibre Channel Protocol- (FCP-) compliant. Such information will enable the probe module 310 to register the FC4 type capability of the Nx_Port with the SNS module 370 and enable other Nx_Ports to query the SNS module 370 and obtain the necessary FCP-based information for communication with this Nx_Port.

The inquiry module 430 initiates probing by beginning an extended link service called process login (PRLI) 720 as defined in X3.230-199X, which is incorporated in its entirety by reference herein. PRLI, like PLOGI, is used to establish the operating environment between a group of related processes at the originating embedded port 220 and a group of related processes at the Nx_Ports. Unlike PLOGI, PRLI determines whether the Nx_Port is FCP compliant 723 as well as whether the Nx_Port is a target 727 end-device. In particular, a PRLI request containing service parameters from the embedded port 220 is transmitted to an Nx_Port to identify to the Nx_Port the capabilities and requirements, which the embedded port 220 supports. The Nx_Port responds to the PRLI sequence by transmitting the related capabilities and requirements of the Nx_Port back to the embedded port 220. Requirements are those FC-4 service parameters (e.g., the parameters controlling the IUs that must be used) that must be agreed upon by both the embedded port 220 and the Nx_Ports for proper operation. Capabilities indicate those FC-4 service parameters that describe the role and state of the Nx_Port in the FC-4 such as whether the Nx_Port is an FCP-compliant initiator or target Nx_Port.

As previously discussed, FCP is a variation of the Small Computer System Interface (SCSI) command set, which is in accordance with the SCSI architecture model (X3.270-199X). The FCP is a two-level paradigm with the input/output (110) operation mapped into an exchange and the request and response primitives of an I/O Operation mapped into the IUs. For FCP I/O operations between the embedded port 220 and an FCP-compliant Nx_Port, the embedded port 220 represents the initiator and the Nx_Ports represents the target.

Upon receipt of the PRLI command, the Nx_Port can reject the PRLI command with an extended link service reject (ELS_RJT) sequence that indicates that the Nx_Port cannot support the required functions, or an accept (ACC) sequence that indicates that the destination Nx_Port accepts the capabilities of the embedded port 220 and agrees to the requirements of the embedded port 220. If the Nx_Port transmits an ACC sequence, the payload of the sequence will include service parameter capabilities including whether the Nx_Port is FCP compliant 723 as well as whether the Nx_Port is an initiator or a target Nx_Port 727.

Once PRLI 720 is completed and the Nx_Port is identified as an FCP-compliant target Nx_Port, the embedded port 220, which also is FCP-compliant, serves as the FCP initiator and initiates an exchange with the FCP-compliant target Nx_Port by transmitting 730 an unsolicited inquiry command, whose FCP_CMND payload contains an inquiry command control block. The FCP_CMND payload is the Execute Command service request, which starts the FCP I/O Operation. The target Nx_Port responds to the inquiry command by transmitting to the inquiry module 430 all of the data requested by the inquiry command including its symbolic name. The symbolic name includes such information as the descriptive name and the vendor of the target Nx_Port. The inquiry module 430 stores 740 this data within the inquiry data storage 470. Information relating to whether the Nx_Port is FCP capable is stored as a bit within the Nx_Port bitmap 450.

The switch port manager module 330 responds to the inquiry module 430 receiving this additional registration information by triggering 560 the SNS module 370 to register the Nx_Port by retrieving all of the registration information from both the switch port manager module 330 and the probe module 430. In particular, the switch port manager module 330 triggers the SNS module 370 to retrieve the service parameter information, including the FC-4 type capability of the Nx_Port, from the Fx_Port table 440, the Nx_Port bitmap 450 and the Nx_Port linked list 460 within the switch port manager module 330. The SNS module 370 also retrieves the symbolic name data of each Nx_Port from the inquiry data storage 470, which is located within the probe module 310. As previously discussed, once an Nx_Port is registered, any registered Nx_Port can query the SNS module 370 to obtain the registration information of any other registered Nx_Port.

To release allocated resources associated with the link between the Nx_Port and the embedded port 220, either the embedded port 220 or the Nx_Port initiates a destination Nx_Port Logout (LOGO), which triggers the Nx_Port and the embedded port 220 to release its port resources that are associated with the IU. In addition, LOGO invalidates the service parameters and Port_Name that were saved by the Nx_Port, thereby freeing those port resources for future exchanges with the embedded port 220 or other Nx_Ports. Once the probe resources for the Nx_Port are released, the corresponding probe IU associated with the embedded port 220 is released and the $IU_{count}$ decremented by 1. The resource manager module 420 then will determine that $IU_{count}$ is below $IU_{max}$ 620, will increment $IU_{count}$ 630 by 1 and will allocate the free probe IU 640 to the next Nx_Port device which is marked within the Nx_Port bitmap 450.

The foregoing description of a preferred embodiment has been presented for purposes of illustration and description. It is not intended to be exhaustive nor to limit the invention to the precise form disclosed. Many modifications and variations are possible in light of the above teaching. For example, the specific implementation of certain features, such as by use of a programmed CPU, may be implemented differently such as in hardware. A preferred embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. A system for providing registration services to a plurality of end-devices coupled to a fabric, at least one of the plurality of end-devices lacking functionality to initiate login to a fabric, comprising:

an inquiry module within the fabric for initiating login with the at least one end-device lacking functionality to initiate login, to receive registration information from the end-device; and a server module, coupled to the inquiry module, for recording the received registration information corresponding to the at least one end-device lacking functionality to initiate login and providing a querying end-device of the plurality of end-devices with the recorded registration information of the end-device lacking functionality to initiate login.

2. The system of claim 1 wherein the server module includes a simple name server module for recording registration information including a symbolic name of each of the plurality of end-devices.

3. The system of claim 1 further comprising:

a resource manager module, coupled to the inquiry module, for allocating probing resources to the inquiry module for concurrent probing of the plurality of end-devices coupled to the fabric.

4. The system of claim 1 further comprising:

a controller module, coupled to the resource manager module, for controlling the probing of the plurality of end-devices.

5. The system of claim 1 further comprising:

a resource manager module, coupled to the inquiry module, for allocating probing resources to the inquiry module for concurrent probing of the plurality of end-devices coupled to the fabric; and a controller module, coupled to the resource manager module, for controlling the probing of the plurality of end-devices.

6. A Fibre Channel system for providing registration services to a plurality of Fibre Channel compliant end-devices, coupled to a fabric, at least one of the plurality of Fibre-Channel compliant end-devices lacking functionality to initiate login to a fabric, comprising:

an inquiry module within the fabric for initiating login with the at least one Fibre-Channel compliant end-devices lacking functionality to initiate login to a fabric, to receive registration information from the end-device; and a server module, coupled to the inquiry module, for recording the received registration information corresponding to the at least one Fibre Channel compliant end-device lacking functionality to initiate login and for providing a querying Fibre Channel compliant end-device of the plurality of Fibre Channel compliant end-devices with the recorded registration information of the Fibre-Channel compliant end-device lacking functionality to initiate login.

7. The Fibre Channel system of claim 6 further comprising:

a resource manager module, coupled to the inquiry module for allocating probing resources to the inquiry module for concurrent probing of the plurality of Fibre Channel compliant end-devices coupled to the fabric.

8. A method for providing registration services to a plurality of end-devices coupled to a fabric, at least one of the plurality of end-devices lacking functionality to initiate login to a fabric comprising the steps of:

initiating login with the at least one end-device lacking functionality to initiate login, to receive registration information from the end-device; and recording within a server module the received registration information corresponding to the at least one end-device lacking functionality to initiate login and providing a querying end-device of the plurality of end-devices with the recorded registration information of the end-device lacking functionality to initiate login.

9. The method of claim 8 wherein the initiating login with the at least one end-device lacking functionality to initiate login comprises the step of identifying whether a first end-device of the plurality of end-devices is compliant with a communication protocol.

10. The method of claim 8 wherein the initiating login with the at least one end-device lacking functionality to initiate login comprises the step of identifying whether a first end-device of the plurality of end-devices is a target end-device.

11. The method of claim 8 wherein the initiating login with the at least one end-device lacking functionality to initiate login comprises the step of transmitting an inquiry command to a first end-device of the plurality of end-devices.

12. The method of claim 8 wherein the initiating login with the at least one end-device lacking functionality to initiate login comprises the steps of:

identifying whether a first end-device of the plurality of end-devices is compliant with a communication protocol;

identifying whether a first end-device of the plurality of end-devices is a target end-device; and responding to identifying the first end-device as compliant with a communication protocol and a target end-device by transmitting an inquiry command to the first end-device of the plurality of end-devices.

13. The method of claim 8 further comprising the step of logging into each of the plurality of end-devices.

14. The method of claim 8 wherein the registration information of each of the plurality of end-devices includes a symbolic name of each of the plurality of end-devices.

15. The method of claim 8 further comprising the step of:

allocating probing resources for concurrently probing the plurality of end-devices coupled to the fabric.

16. The method of claim 15 wherein allocating probing resources comprises the step of:

maintaining a bitmap wherein the bitmap is altered to indicate which end-devices have been allocated probing resources.

17. The method of claim 15 wherein allocating probing resources comprises the step of allocating an information unit to a first end-device of the plurality of end-devices.

18. The method of claim 8 further comprising the step of:

triggering the initiating login with the at least one end-device lacking functionality to initiate login upon detecting an active switch port.

19. The method of claim 8 further comprising:

allocating probing resources for concurrently probing the plurality of end-devices coupled to the fabric; and triggering the initiating login with the at least one end-device lacking functionality to initiate login upon detecting an active switch port.

20. The method of claim 8 further comprising:

logging into each of the plurality of end-devices;

allocating probing resources for concurrently probing the plurality of end-devices coupled to the fabric; and triggering the initiating login with the at least one end-device lacking functionality to initiate login upon detecting an active switch port.

* * * * *